Sept. 2, 1969

M. J. COUVREUR 3,465,164

LOGIC ADAPTIVE PROCESS AND SYSTEM FOR THE AUTOMATIC
CONTROL OF THE PRODUCTION OF POWER IN
INTERCONNECTED ELECTRIC NETWORKS

Filed Nov. 28, 1966

United States Patent Office 3,465,164
Patented Sept. 2, 1969

3,465,164
LOGIC ADAPTIVE PROCESS AND SYSTEM FOR THE AUTOMATIC CONTROL OF THE PRODUCTION OF POWER IN INTERCONNECTED ELECTRIC NETWORKS
Michel Joseph Couvreur, 2 Rue Hicquet,
Auvelais, Belgium
Filed Nov. 28, 1966, Ser. No. 597,409
Claims priority, application Belgium, Mar. 29, 1966, 678,622
Int. Cl. H02j 1/10, 3/00
U.S. Cl. 307—57
23 Claims

ABSTRACT OF THE DISCLOSURE

In a system for automatically controlling the production of power in interconnected electric networks operating in synchronism, logic means are provided such that the control signal is effective only in specified conditions and within prescribed limits in order to reduce the power deviation in a variable manner according to the actual working conditions in the interconnected networks.

---

The invention relates to a system for automatically controlling the production of power in electric networks which form part of a group interconnected by high-tension lines and operating in synchronism.

In such a group, as well as in each of the associated networks, it is necessary to regulate the production of power in the aim of continuously adapting it to the consumption, to the variations of the exchange programmes between the networks and also to the deviations and incidents in the production itself. Furthermore, it is important to distribute the production between the generators which are in service in such a way that demand is satisfied in the most economic manner. This economic distribution is carried out from a main dispatching station in each network; two cases are to be considered, depending on whether the economic distribution is effected by human intervention or automatically.

In the first case, that is to say when the economic distribution is assumed by human intervention, the regulation of the production is effected in three stages, which are called: primary control, secondary control and tertiary control.

The primary control corresponds to the rapid action of the turbine speed regulator, which tends to maintain the frequency in the region of its nominal value.

The tertiary control corresponds to the necessarily slow action exerted by the wattman of the power stations on the output setting of the generators, in executing provisional programmes and orders received from the main dispatching of the network in question; these orders are developed in such a way as to adapt the production of the network to the working conditions in achieving the economic optimum.

The secondary control is aimed to resorb locally in each network the control deviation of the said network during the transistory periods of average duration (for example 3 to 30 minutes), during which it is impossible or inopportune for the tertiary control to become operative in an efficient or complete manner.

It is to be noted that the control deviation of a network is given as known by the binome $\Delta P_E + K \Delta f$, in which:

$\Delta P_E$ is the deviation, with respect to the programme, of the power exchange with the adjacent networks by the interconnection lines ($\Delta P_E$ is positive in the case of the deviation in the sense of exportation);
$\Delta f$ is the frequency deviation with respect to the nominal frequency;
K is the "regulating energy" of the network in question (or the "frequency bias" in American terminology).

The secondary control uses a network regulator by which orders for altering production, such that the control deviation of the network in question is resorbed, are sent automatically from the main dispatching station of each network toward the stations of this network.

In the second case, that is to say when the economic distribution is effected automatically, the secondary and tertiary controls can be intimately associated or even blended. The essential is to know that, in this case, a network regulator establishes at any instant an order signal of which the value fixes the production to be developed in the network.

In both cases, there is thus a central control equipment for the network; in the first case, it concerns the secondary control; in the second case it elaborates the orders which resulted in the first case from both secondary and tertiary controls.

Until now, the central control system of the network was based on the introduction of the control deviation into a linear regulator, generally of the integral type or of the proportional-integral type, of which the working coefficients were set manually on a console of the main dispatching station; this control was thus designed so as to act in a uniform systematic manner in response to the control deviations, in accordance with the properties of the aforesaid regulators.

Such a control consequently takes only into account the measured control deviation, even if this deviation is not basically harmful, and does not take into account other factors which can have an effect on the efficiency of the operation or on the safety of the network, such as for example the fall in efficiency caused in the regulating stations by useless and frequent variations of production, the overloading of the lines, the opportunity of causing the intervention of exceptional means of action for guarding against incidents in the networks and power stations.

The invention not only has for its object to overcome the disadvantages and shortcomings of the previous solutions, but it results of a new conception of the problem, and otherwise the development of the invention was the occasion of showing or understanding for the first time certain disadvantages of previous solutions.

In fact, the invention is concerned with an automatic control process and system which comprises the following features:

(1) The control deviations are not corrected in an uniform systematic manner; on the contrary, one avoids the elimination of the control deviations which are not strictly harmful from the point of view of operation, safety and economy factors, which constitute the underlying reasons for bringing into effect the secondary control component; furthermore, a too energetic resorption of certain other control variations is avoided, wherever such a severe procedure would cause more disadvantages than advantages, because of the disturbances which it would cause for the generators to which the regulting action is applied;

(2) In opposition with the moderation which has been discussed above, the characteristics of the control action make it possible to exert safety control actions in addition to the normal control action on the generators; these safety actions consist particularly, for keeping up with accidental power deficits, in causing the intervention of normally unavailable power reserves (possibilities of overload, closure of the bleeding devices of steam turbines), in automatically bringing into operation quick-starting units (turbo-jets), in causing load-shedding of equipments who may accept a temporary stoppage (electrolysis installations, crushing and grinding plants followed by storage silos, . . .) and load-shedding of non-priority consumers if the safety of the network is jeopardized; these intermittent actions can take place by automatic remote control or by the establishment of warning signals followed by immediate manual action (automatic control with operator guidance);

(3) In addition, in the event of accidental power deviation in an adjoining network, provision can be made for the control means to set up orders for tripping one or more of the interconnections with the outside (sectionalizing of networks), in order to prevent in time serious disturbances inside the network in question; these disconnections can be effected by automatic remote control or by the establishment of warning signals followed by immediate manual action (automatic control with operator guidance).

This process is based on automatically bringing to operation, in the control system, supplementary criteria in addition to the control deviation, in such a way as to "adapt" the elaboration of the control orders in variable manner, depending on certain working conditions in the interconnected networks.

The invention also provides an automatic control system which, in accordance with this process, thus acts not only as a function of the measured control deviation, but also as a function of certain supplementary parameters established on the basis of working data. Such a system thus has the advantage of varying its response according to the state or the value of certains parameters in connection with the working conditions. This system has an internal intelligence which makes it suitable for seeing whether it is opportune to react and, if so, how it must react in order to ensure a best possible regulation. For this purpose, it employs an internal logic system which continuously verifies the state or the value of the parameters and, in accordance therewith, controls the transmission of an appropriate signal towards the regulating elements.

Furthermore, the control system resulting from the invention provides the possibility of a direct coordination of the control of several networks of the interconnected group, by virtue of coordination signals transmitted between the dispatching stations of the networks by telemetering or telesignalling installations.

The different parameters intervening in the internal logic unit of the system are elaborated in peripheral circuits, either by an analogue procedure or by a digital procedure. The control system which is under discussion here can comprise as many peripheral circuits as desired parameters, and the influences of the latter on the behaviour of the logic unit may be combined according to the characteristics of the networks.

The features and details of the present invention will become apparent from the description of one embodiment accompanied by the enclosed figures, in which.

The invention will be described by reference to one embodiment, but it is quite obvious that the latter does not in any way limit the scope of the invention.

Figure 1:
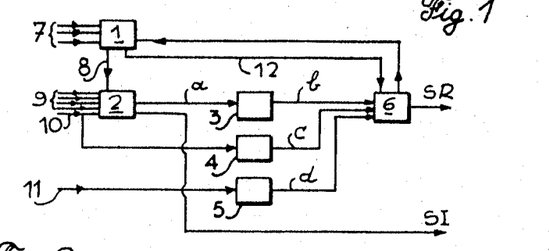
FIGURE 1 is a general functional diagram of the control system according to the invention.

FIGURE 1 shows a general functional diagram of the automatic control system described by way of example. The system comprises peripheral circuits 1, the logic unit 2, the regulting circuits represented by 3, 4 and 5, and the output circuits 6. The peripheral circuits establish various parameters on the basis of data introduced at 7. The parameters are set according to needs to the input logic unit 2 and to the output circuits 6. The logic unit receives: firstly, the parameters 8 supplied by the peripheral circuits and, secondly, the telemetering of the frequency 10 and that of the power flow 9 on the lines providing the interconnection with the adjoining networks. The comparison of these telemetering results with the corresponding standard or programme values makes it possible to establish the terms $\Delta f$ and $\Delta P_E$ of the control deviation. On the basis of the latter and according to the state or the value of the parameters the logic unit determines the deviation signal to be sent to the regulating circuit 3 which, for the deviation signal taken in opposite sign, elaborates therefrom, in the example in question, the integral with respect to time (integral regulator). In addition, regulator circuits 4 and 5 are provided, the purposes of which will be discussed hereinafter. The regulator circuits thus act under the influence of signals which take into account various factors related to the operation of the network. The purpose of the output circuits 6 is firstly to combine the signals originating from 3, 4 and 5 in order to establish the control signal, and secondary to limit the amplitude of the latter; this limitation is itself also adapted by certain parameters, in the sense that the limitation thresholds can be varied under the effect of parameters received from the peripheral circuits by way of 12. At the output of the circuits 6, there is accordingly obtained a regulating signal SR, which is perfectly adapted to the true working conditions and which will control the variation in power production in the best possible manner. This regulating signal is firstly used in conventional manner for acting on the generators; in addition, it is also used for exerting intermittent actions on the production and the consumption of power, when it exceeds certain threshold values. Moreover, the logic unit 2 can establish directly one or more sectionalizing signals SI adapted to be used for ordering the tripping of interconnections under exceptional conditions.

There will now be set out in detail the composition of the different circuits, starting with that of the peripheral circuits.

In the embodiment described by way of example, the peripheral circuits are provided for establishing a certain number of different criteria. In particular: the "overload" criterion $cS$, the "programme" criterion $cP$, the "tendency" criterion $cT$, the "frequency" criterion $cF$, the "harmful frequency" criterion $cGF$, two "limitation" criteria $cL1$ and $cL2$ and "tripping" criteria $cD$. There will firstly be given a summary definition of these criteria, in order to show the multiple aspects of the intervention of the internal logic of the system.

The "overload" criterion indicates whether there is or not a danger of overload of interconnection elements, under the effect of exchange power deviations of the network under consideration, in one direction or the other; there is envisaged not only the interconnections with the adjoining networks, but also the internal interconnection elements of the network in question and even interconnections disposed in the adjacent networks.

The "programme" criterion consists in estimating whether or not there is a hazard that the control deviation of the network in question exceeds a permitted tolerance, as average value, during the present period (for example, one hour).

The "tendency" criterion establishes a comparison between the value of the control signal and the value which it should have or to which it should tend if the load of the network would vary in accordance with the provisional diagram provided for the day.

The "frequency" criterion indicates that the frequency is not at its nominal value.

The "harmful frequency" criterion detects an abnormal deviation in frequency about a certain normal margin of variation on either side of the nominal value.

The "limitation" criteria indicate if the control signal reaches one of the limits of certain variation zones; a distinction is made between two zones: that of normal variations and that of the maximum possible variations (the second comprises and exceeds the first).

The "tipping" criteria consist in indicating the eventual tripping of certain important interconnecting elements (interconnections with the adjoining networks or internal connections of the network under consideration).

Each of these criteria is in actual fact duplicated, in order to permit of exerting, a discriminatory action according to the direction of the control deviations. For example, there is provided a positive "programme" criterion $cP+$ and a negative "programme" criterion $cP-$.

It is seen that these different criteria are designed to give at any moment a complete picture of the true working conditions from the point of view of the fundamental objectives of the control process forming the subject of the invention.

In the peripheral circuits adopted in the constructional example which is described, the criteria are elaborated in analogue form in the cricuits which are shown in FIGURES 2 to 7.

Figure 2:
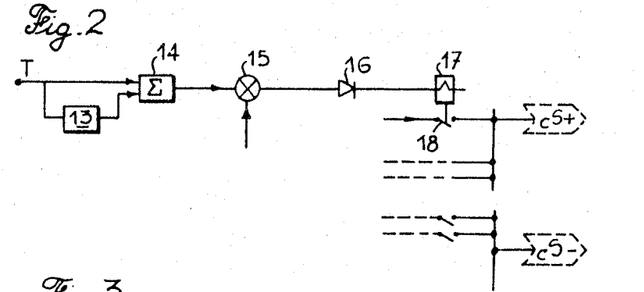
FIGURES 2 to 7 present the diagrams showing the principle of the peripheral circuits used in the embodiment as described.

FIGURE 2 presents the diagram showing the principle of the circuit which elaborates the "overload" criterion. When the danger of overload of the interconnections is of thermal nature, this criterion is based on the temperature of the line conductors or the transformer windings which are most endagered by overloading under the effects of exchange power deviations with the adjoining networks, in one direction or the other. The elaboration of the criterion not only allows for the value of the temperature, but also for the instantaneous heating, in such a way as to introduce a predictive factor. Thus, there is applied to the input of the summator 14, firstly a signal representing the temperature T, and secondly, via 13, a signal which is proportional to the derivative of the temperature with respect to time. The signal at the output of the summator is compared in the comparator element 15 with a warning threshold. The exceeding of this latter is detected by the rectifier element 16 and energises a relay 17. A contact 18 of the latter is then closed and transmits a warning signal. One such circuit is provided for each network element where there is a possibility of a danger of overloading. As certain interconnection elements can be overloaded under the effect of an exchange power deviation in one direction (for example, excess of exportation of power towards the adjoining networks), and as other elements can on the contrary be endangered by deviations in the opposite direction, the warning arrangements of the first group, on the one hand, and those of the second group, on the other hand, are connected in parallel; there are thus formed two "overload" criteria, each corresponding to one sign of the deviations; they are symbolised by $cS+$ and $cS-$. If, for certain fairly long interconnections, the overload criterion becomes the voltage drop in modulus or the phase deviation between the two ends (which deviation determines the stability), it is possible to provide a circuit comparable to that of FIGURE 2, but in which the temperature is replaced by an image of the amplitude or phase deviation between two voltages.

If the warning signal is established in the high-voltage stations, it is transmitted to the main dispatching station by remote signalling. However, the image of the temperature can also be transmitted directly to the main dispatching station by telemetering.

Figure 3:
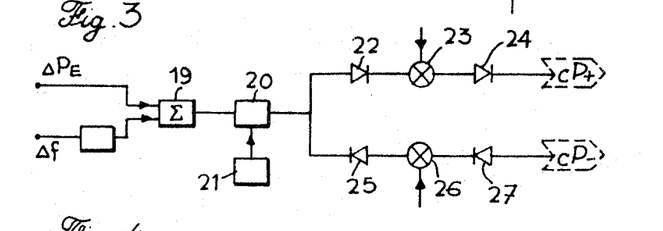

FIGURE 3 presents the diagram showing the principle of the circuit establishing the "programme" criterion. The control deviation, established in the summator 19 from the binome $\Delta P_E + K\Delta f$, is introduced into a time integrator 20. Thus, during each period of one hour, this latter supplies the energy deviation, for which the network in question is responsible with respect to the interconnected outside group. The clock 21 controls the resetting of the integrator to zero after each hour period.

The energy deviation, of which the sign is detected by the rectifier elements 22 and 25, is compared in comparator elements, 23 and 26 respectively, with an adjustable tolerance (either manually, or by a recorded programme). If the tolerance is exceeded on one side or the other, this being detected by one or other of the rectifier elements 24 and 27, one or other of the criteria $cP+$ and $cP-$ is rendered effective.

Figures 4, 5:
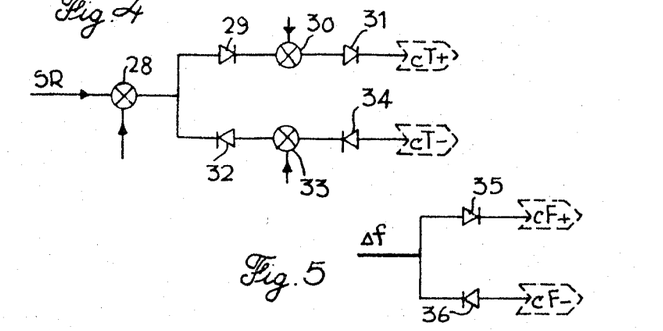

FIGURE 4 presents the diagram showing the principle of the circuit establishing the "tendency" criterion. It is a question in this case of comparing the value of the control signal SR with a reference value as hereinafter defined. The control signal and the reference variable are applied to the comparator element 28. The deviation, of which the sign is detected by the rectifier elements 29 and 30, is compared in the comparator elements, 30 and 33 respectively, with a certain tolerance. If the tolerance is exceeded, which, is detected by one or other of the rectifier elements 31 and 34, one or other of the criteria $cT+$ and $cT-$ is rendered operative. The reference value can be variable during the day. If the regulator pilots an automatic equipment for economic dispatching, the reference variable is formed by the value of the control signal corresponding to a combination of the provisional load at the moment in question and the derivtive of the latter with respect to time. If the regulator simply effects a secondary control, the reference value is regularly the mean value of the control signal, except possibly at certain moments during the day, when the control must usually intervene in systematic manner in a given sense. It is seen that this "tendency" criterion permits of taking into account the provisional development of the load programme.

FIGURE 5 presents the diagram showing the principle of the circuit establishing the "frequency" criterion. This circuit comprises only two rectifier elements 35 and 36, which detect the sign of the frequency deviation with respect to the nominal value of the latter.

Figure 6:
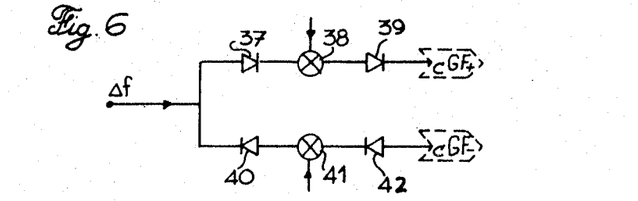

FIGURE 6 presents the diagram showing the principle of the circuit establishing the "harmful frequency" criterion. The frequency deviation $\Delta f$, of which the sign is detected by the diodes 37 and 40, is compared with a tolerance of normal variation with respect to the nominal value by means of the comparator elements, 38 and 41 respectively. If the tolerance is exceeded on one side or the other, this being detected by one or other of the rectifier elements 39 and 42, one or other of the criteria $cGF+$ and $cGF-$ is rendered effective.

Figure 7:
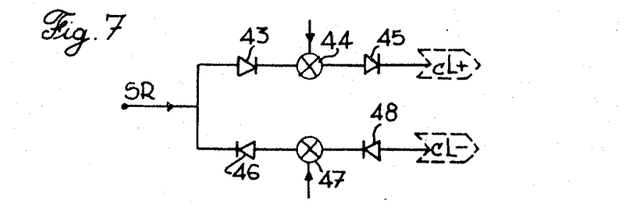

FIGURE 7 presents the diagram showing the principle of the cricuit establishing one of the "limitation" criteria. The control signal, of which the mean value is assumed to be represented by a zero voltage, is compared with the envisaged limits, by means of the rectifiers 43 and 46 and the comparators 44 and 47. If the limits are exceeded in one direction or the other, this being detected by one or other of the rectifier elements 45 and 48, one or other of the criteria $cL+$ and $cL-$ is rendered effective.

Finally, the "tripping" criteria are simply formed by the remote signalling of the position of the corresponding circuit breakers.

The different criteria established in the peripheral circuits as described above serve as variable parameters controlling the circuits of the logic unit 2.

FIGURES 8 to 12 present the logic circuits provided in the arrangement in question.

Figure 8:
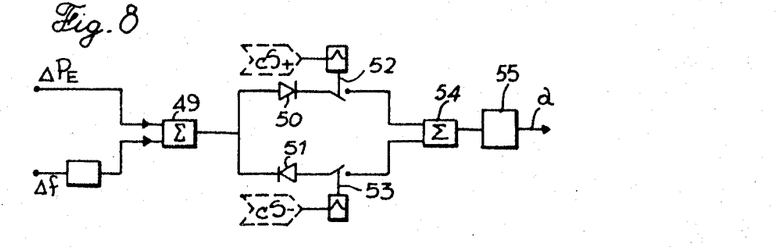
FIGURES 8 to 12 present the diagrams showing the principle of the logic circuits used in the embodiment as described.

FIGURE 8 presents the diagram showing the principle of the "overload" logic circuit. The summator 49 establishes an input signal $\Delta P_E + a\Delta f$, in which $a$ is a coefficient comparable to the "controlling energy" K (the "frequency bias" in American terminology), but it is given a substantially smaller value, so as to make the "overload" circuit sensitive to a certain degree to the control deviations of the external networks (in certain cases, one will go as far as taking for $a$ a decreasing function of the temperature of the interconnection element most subject to danger of overload). At the output from 49, there is to be seen two circuit branches containing a rectifier element 50, 51, and a switching element which is here made in the form of a normally open contact of the relays 52, 53 (it is to be noted that in the following description, the position known as "normal" of the relay contacts is that which is provided when the corresponding criterion, that is to say, the corresponding warning, is absent or inactive). The rectifier elements 50 and 51 are connected in opposition to one another, so as to switch the positive signal (i.e. corresponding to a deviation in the direction of power exportation) in the upper branch, and the negative signals in the lower branch. The criterion $cS+$ energises the relay 52 when an interconnection element is endangered by overloading, under the effect of positive deviations of exchange power of the network in question. The contact of the relay 52 then closes the positive branch, which thus transmits the positive deviations towards the regulator element. Similarly, it is necessary for the criterion $cS-$ to energise the relay 53, in order that the negative deviations are transmitted towards the regulator element.

Figure 9:
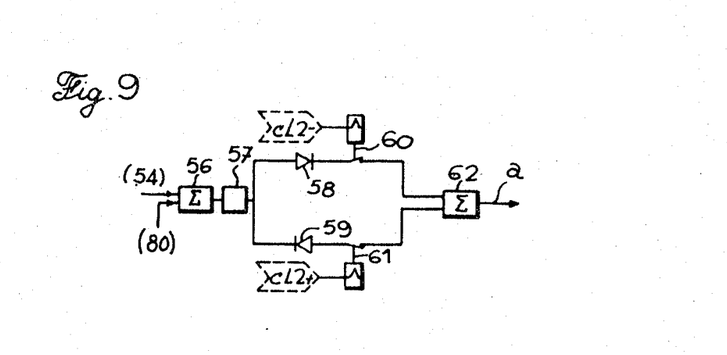

The signal received at the output of the sunmmator 54 passes through a circuit 55 which is shown diagrammatically in FIGURE 9. The circuit 55 comprises a summator 56, the purpose of which will be hereinafter apparent, a bilateral amplitude limiter 57 having the effect of limiting the speed of variation of the control signal (in effect, the regulator element 3 is of the integral type), and a circuit (58 to 62) which is dependent on the limitation criteria $cL2+$ and $cL2-$, relating to the permissible extreme limits of the control signal. The purpose of the limiter 57 is to avoid the regulated generators being acted upon too suddenly (in certain cases, the limit in question will be made an increasing function of the temperature of the interconnection element most seriously endangered by overloading).

In the possible case where the control signal reaches its accepted maximum limit on one side or on the other, that is to say, when the criterion $cL2+$ or $cL2-$ is sensitised, a normally closed contact of a relay 61 or 60 trips the input circuit for the opposite sign of the deviation signal, so as to prevent the useless and harmful continuation of the integration in the regulator element 3.

Figure 10:
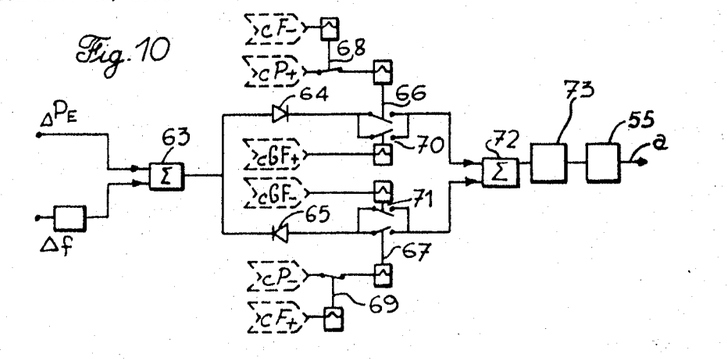

FIGURE 10 presents the diagram showing the principle of the "programme" logic circuit. It is seen that this circuit is fundamentally identical with that of FIGURE 8, but the summator 64 now establishes the true control deviation of the network, namely, $$\Delta P_E + K \Delta f$$

On the other hand, each branch comprises several switch elements combined in such a way as to cause intervention of the programme criteria $cP+$ and $cP-$, of the frequency criteria $cF+$ and $cF-$, and of the harmful frequency criteria $cGF+$ and $cGF-$. The incidence of each of these criteria will be successively analysed.

(a) In the case where the energy deviation from the start of the hourly period exceeds a fixed tolerance, let it be said in the positive direction, the parameter $cP+$ energizes the relay 66, of which the normally open contact closes the circuit of the positive branch: the positive deviations are thus transmitted towards the regulator element, which will tend to compensate them and conseqeuntly to limit the energy deviation.

(b) If the energy deviation coincides with a frequency deviation of opposite sign, that is to say, with a power deviation in the opposite direction for the interconnected group, the parameter $cF-$ energize, the relay 68, of which the normally closed contact breaks the circuit of $cP+$. In this way, the network is prevented from correcting deviation which far from having an unfavourable influence on the external group, are beneficial to it.

(c) In the case of an abnormal frequency deviation, let it be said in the positive direction for example, the parameter $cGF+$ energizes the relay 70 and causes the closure of its normally open contact which transmits the positive deviation, even if the parameter $cP+$ has not or has not yet caused the closing of the contact of relay 66. The reason for this latter circuit is that it is not permitted, in the event of an abnormal frequency deviation, to tolerate power deviations which tend to increase the general harm.

The "programme" logic system is thus perfectly adapted to all the working conditions having an effect on the logic requirements with respect to the energy exchange programme.

Figure 11:
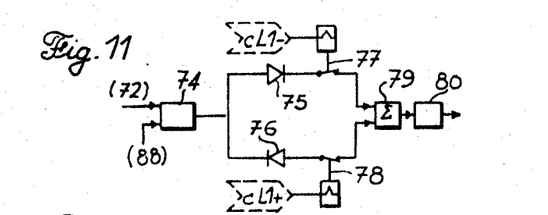

After the summator 72, is arranged a first circuit 73, shown diagrammatically in FIGURE 11. This circuit comprises a summator 74, the purpose of which will be hereinafter described, a circuit being dependent on the limitation criteria $cL1+$ and $cL1-$ and a bilateral amplitude limiter 80. When the control signal reaches one of the limits of the zone of its normal variations, the criterion $cL1-$ or $cL1+$ is rendered effective and opens the normally closed contact of the relay 77 or 78, so as to break the input circuit for the opposite sign of the deviation signal and to prevent the useless and harmful continuation of the integration in the regulator element 3. The bilateral amplitude limiter 80 has for its object to limit the speed of the usual variations of the control signal so as only to influence the controlled generators in a very moderate manner. The output of the circuit 73 is connected to the input of the circuit 55 already described above (FIGURE 9).

Figure 12:
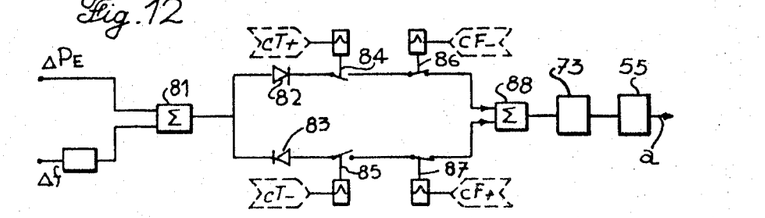

FIGURE 12 presents the diagram showing the principle of the "tendency" logic circuit. This circuit is fundamentally similar to that of FIGURE 10. Like this latter, it starts from the control deviations $\Delta P_E + K \Delta f$, but each branch this time contains two switch elements in series. When the control signal has deviated too much from its reference value, the parameter $cT+$ or $cT-$ energizes the relay 84 or 85, the contact of which is normally open. The control deviations of like sign are then transmitted towards the regulator element, the contacts of the relays 86 and 87 being normally closed. However, if a frequency deviation of given direction, for example negative, causes the appearance of the corresponding parameter $cF-$, this latter energizes the relay 86, of which the normally closed contact breaks the circuit of the positive branch; similarly, the parameter $cF+$ energizes the relay 87, of which the normally closed contact breaks the circuit of the negative branch. The purpose of this is to avoid the control of the network tending to correct a deviation which, far from having an unfavourable influence on the interconnected group, is on the contrary beneficial to it. After the summator 88, the "tendency" logic circuit is connected in succession to the circuits 73 and 55 previously described. There has thus been provided a logic circuit which tends to correct the control deviations which run contrary to the provisional evolution of the load diagram of the network in question, except if these deviations are favourable to the steadiness of the frequency in the interconnected group.

The "overload," "programme" and "tendency" logic circuits, combined in the manner indicated, supply a signal $a$ which is applied to the regulator member 3 (FIGURE 1). It has already been said that, in the example described herein, this element is formed by a regulator of conventional integral type.

The purpose of the "tripping" criteria remains to be explained. These criteria do not form the subject of a specific diagram, because the action of these criteria in the logic of the system is essentially dependent on the structure of the network and of its interconnections with the adjoining networks. It is only possible to indicate a few examples thereof. If the network in question is interconnected to an adjoining network by several lines, the tripping of one of them will be used, in certain circumstances, for causing a reduction or the cancellation of the term "exchange programme" intervening in the deviation $\Delta P_E$, as well as the closure of contacts in parallel with those of the relays 52 and 53, so as to prevent the danger of the remaining interconnections being overloaded. On the other hand, if the network in question is only connected to the outside network by a single line, the tripping of this latter must cause the elimination of the term $\Delta P_E$ at the input of the logic circuits. It is to be noted that the trippings which have been discussed here concern only permanent breaks, and not the trippings which are followed immediately by reclosing (transient defects).

Figure 13:
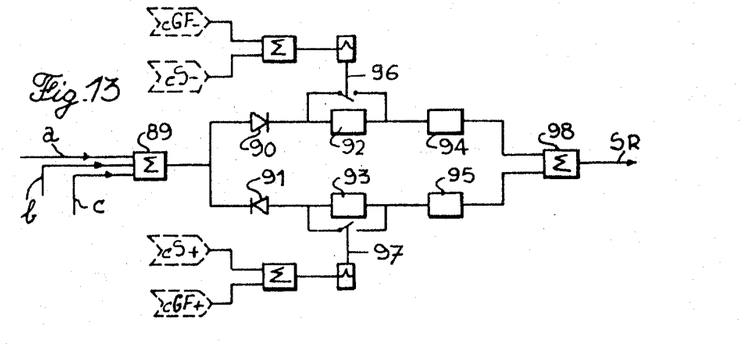
FIGURE 13 presents the diagram showing the principle of the output circuits used in the embodiment as described.

FIGURE 13 presents the diagram showing the principle of the output circuits 6. They comprise essentially, for each sign of the variation in the control signal, two amplitude limiters 92 and 94, on the one hand, and 93 and 95 on the other hand. The limiters 92 and 93 correspond to the normal limits of the control signal, that is to say, the thresholds which are not exceeded in normal time. On the other hand, the limiters 94 and 95 correspond to the absolute limits of the control signal. The marginal zones contained between the limits 92 and 94 and between the limits 93 and 95 correspond to the bringing into operation of means of action which are quite exceptional. For example, between 92 and 94, there will be intervention of certain possibilities of generator overload; this will be moreover, at certain increasingly higher thresholds in this control signal zone, by means of overshoot detector devices which are possibly distributed in the network, the automatic bringing into service of quick-starting units, the load-shedding of isolated receivers and even the cutting-off of feeders supplying non-priority customers (obviously, safety devices are provided for detecting possible parasitic signals before causing such interruptions). The limiter 92 or 93 is short-circuited by a normally open contact 96 or 97, respectively, in the event of the intervention of the "overload" criterion $cS-$ or $cS+$, respectively, or in the event of the appearance of the "harmful frequency" parameter $cGF-$ or $cGF+$, respectively. Indeed, these parameters are only effective under those circumstances when the general safety of the network is menaced and when consequently no possibility of efficient action on the production and on the consumption of the network must be neglected. The control signal SR is obtained at the output of the summator 98.

It is still necessary to set out the nature of a few supplementary circuits. The circuit of the regulator elements 4 and 5 is extremely simple. The first of the circuits consists of a proportional regulator 4 fed by the frequency deviation 10.

The second eventual circuit, acting on a proportional regulator 5, has for its object to cause the intervention of a component received by telemetering from the main dispatching station of an adjacent network, which would serve the part of a coordinator for a sub-group of networks within the general interconnected group. The duty of this special circuit may be explained as follows. Normally, interconnected groups result from numerous networks separated by arbitrary historic or commercial frontiers; it results therefrom that dissimilar structures are possible in which large networks are associated to small networks, every one of them exerting an identical control. Substantial increase in reliability and effectiveness of the interconnections may be gained in certain circumstances, if each of the constituting regions in a large network would be capable of cancelling as large a part of their accidental deviations as possible. On the contrary, where several small networks are connected to each other in the general group or where they constitute satellites connected to one of the great partners of the group, it may be advantageous to coordinate the respective regulating actions within the sub-group which comprises the said adjoining networks; this would especially permit the spinning reserves in the sub-group to be efficiently coordinated and would prevent heavy repercussions when incidents occur; thus, it may be desirable to plan the control system of the interconnected group so as to divide the group into some large sub-groups, each comprising one or several networks; a main regulator is then provided for each sub-group and a subordinate regulator is provided for each network in the sub-group; the orders originating from the main regulator member are then transmitted through the subordinate regulator members and are adapted therein, if necessary, to allow for local emergency conditions.

Lastly, the circuits intended to establish directly one or more sectionalizing signals from 2, result directly from the bringing into operation of criteria and logic circuits which are quite comparable to those which have been described above. Briefly, an order for cutting the interconnection will be established by the simple juxtaposition of the following logic conditions:

(a) A considerable deviation $\Delta P_E$ exists in a given sense (the problem usually arises for deviations in the direction of exportation);

(b) The deviation $\Delta P_E + K\Delta f$ remains inferior to a nuormal tolerance margin (that which clearly signifies that the network in question is not responsible for the deviation $\Delta P_E$ and that this latter is the fault of an external network);

(c) The deviation $\Delta P_E$ involves a danger of overloading ("overload" criterion) for an interconnection element inside the network in question, or there is a very considerable frequency deviation ("harmful frequency" criterion with a large value of the tolerance).

It is seen that the juxtaposition of such conditions indicates that the network in question is subject to serious inconveniences because of the outside group and that it is then justified to disconnect it therefrom.

This is the purpose of the establishment of sectionalizing signals. Depending on the more or less looped structure of the interconnections, it will be indicated to disconnect all the interconnection with the outside without any distinction or, on the contrary, to disconnect only certain of them, and these will then be selected on the basis of the measurement of the individual flow of power on each of them and on the basis of the topology of the interconnections.

The foregoing description has shown the multiple possibilities of adaptation of the control system under consideration, by virtue of the intelligence of an internal logic system.

In the embodiment described, the establishment of the different parameters and the logic circuits are carried out by an analogue method. However, they could be equally well established by a digital method and, in this case, instead of a wired logic unit using in particular relay contacts, it will be possible to use an unwired logic unit which makes use of a computer or process control ordinator.

What I claim is:

1. In a system for controlling the production of power in an area integrated in an interconnected electric network, the combination comprising means responsive to a signal representative of the power interchange control deviation and to a signal representative of the frequency deviation and to signals representative at any time of specific electric or thermal data or both, from a plurality of monitoring points in the area for providing a plurality of signals whose binary states are indicative of the instantaneous actual condition of the area, input logic means responsive to said signals indicative of the instantaneous actual condition of the area and to a signal representative of the power interchange deviation and frequency deviation for gating this latter signal only when particular of said signals indicative of the instantaneous condition of the area are in a predetermined one of their respective two binary states, summing means for combining the output signals from said logic means to provide an error signal, regulating means responsive to said error signal for producing the time integral of the inverse of said error signal, and output means responsive to the output signal from said regulating means to provide a control signal having an amplitude not exceeding predetermined maximum and minimum thresholds, thereby to provide an adaptative control in the area.

2. The system of claim 1, wherein there is further provided logic means responsive to the control signal for increasing the maximum threshold of the control signal in the said output means.

3. The system of claim 1, wherein there is further provided means responsive to a signal from a supervisor regulator that supervises a group of adjoining areas in the interconnected system for providing an additional signal component, this component being added to the said integrated error signal, thereby to provide an accurate control for the said group as a whole in spite of a loose adaptative control in supervised individual areas.

4. The system of claim 2, wherein there is further provided means responsive to a signal from a supervisor regulator that supervises a group of adjoining areas in the interconnected system for providing an additional signal component, this component being added to the said integrated error signal, thereby to provide an accurate control for the said group as a whole in spite of a loose adaptative control in supervised individual areas.

5. In a system for controlling the production of power in an area integrated in an interconnected electric network, the combination comprising means responsive to a signal representative of the integrated control deviation with cyclic reset to zero for providing first duplicated signals indicating if the control deviation exceeds a predetermined value in either positive or negative polarity, means responsive to a signal representative of the frequency deviation for providing second duplicated signals indicative of the sign of the frequency deviation and third duplicated signals indicating if the frequency deviation exceeds a predetermined value in either the positive or negative polarity, input logic means responsive to a signal representative of the control deviation and to the said first, second and third signals for gating the signal representative of the control deviation for the same polarity as that of the actuated of the said first or third signals, each of said first signals being inhibited when the actuated of said second signals is of the opposite polarity, regulating means responsive to the error signal for producing the time integral of the inverse of said error signal, and further comprising means responsive to a signal from a supervisor regulator that supervises a group of adjoining areas in the interconnected system for providing an additional signal component, said component being added to the said integrated error signal, thereby to provide an accurate control for the said group as a whole in spite of loose adaptative control in supervised individual areas.

6. In a system for controlling the production of power in an area integrated in an interconnection electric network, the combination comprising means responsive to a signal representative of the integrated control deviation with cyclic reset to zero for providing first duplicated signals indicating if the control deviation exceeds a predetermined value in either positive or negative polarity, means responsive to a signal representative of the frequency deviation for providing second duplicated signals indicative of the sign of the frequency deviation and third duplicated signals indicating if the frequency deviation exceeds a predetermined value in either the positive or negative polarity, means responsive to the control signal for providing fourth duplicated signals indicating if said control signal deviates from a prescribed value in either the positive or negative polarity, input logic means responsive to a signal representative of the control deviation and to the said first, second and third signals for gating the signal representative of the control deviation for the same polarity as that of the actuated of said first or third signals, each of said first signals being inhibited when the actuated of said second signals is of the opposite polarity, input logic means responsive to a signal representative of the control deviation and to the said second and fourth signals for gating the signal representative of the control deviation for the same polarity as that of said fourth signal, the latter signal being inhibited if the said second signal is of the opposite polarity, summing means for combining the output signals from said logic means to provide an error signal, regulating means responsive to the said error signal for producing the time integral of the inverse of said error signal, and means responsive to a signal from a supervisor regulator that supervises a group of adjoining areas in the interconnected system for providing an additional signal component, this component being added to the said integrated error signal, thereby to provide an accurate control for the said group as a whole in spite of a loose adaptative control in supervised individual areas.

7. In a system for controlling the production of power in an area integrated in an interconnected electric network, the combination comprising means responsive to signals representative of the instantaneous temperature of determined elements in the area which are significantly influenced by positive power interchange deviations, thereby to provide a positive warning signal when one of said signals applied at the input thereof exceeds a predetermined alarm threshold, means responsive to signals representative of the instantaneous temperature of determined elements in the area which are significantly influenced by negative power interchange deviations, thereby to provide a negative warning signal when one of said signals applied at the input thereof exceeds a predetermined alarm threshold, means responsive to a signal representative of the integrated control deviation with cyclic reset to zero for providing first duplicated signals indicating if the control deviation exceeds a predetermined value in either the positive or negative polarity, means responsive to a signal representative of the frequency deviation for providing second duplicated signals indicative of the sign of the frequency deviation and third duplicated signals indicating if the frequency deviation exceeds a predetermined value in either the positive or negative polarity, input logic means responsive to a signal representative of the power interchange deviation and frequency deviation, and to the said positive and negative alarm signals for gating the said signal representative of the power interchange deviation and frequency deviation for the same polarity as that of the actuated of said alarm signals, input logic means responsive to a signal representative of the control deviation and to the said first, second and third signals for gating the signal representative of the control deviation for the same polarity as that of the actuated of said first or third signals, each of said first signals being inhibited when the actuated of said second signals is of the opposite polarity, summing means for combining the output signals from said logic means to provide an error signal, regulating means responsive to the said error signal for producing the time integral of the inverse of said error signal.

8. The system of claim 7, wherein there are further provided logic means responsive to the said control signal, and to an alarm signal or a signal representative of a predetermined frequency drop or both, said logic means being effective to increase the maximum threshold of the control signal in the said output means.

9. The system of claim 7, wherein there is further provided means responsive to a signal from a supervisor regulator that supervises a group of adjoining areas in the interconnected system for providing an additional signal component, this component being added to the said integrated error signal, thereby to provide an accurate control for the said group as a whole in spite of a loose adaptative control in supervised individual areas.

10. The system of claim 8, wherein there is further provided means responsive to a signal from a supervisor regulator that supervises a group of adjoining areas in the interconnected system for providing an additional signal component, this component being added to the said integrated error signal, thereby to provide an accurate control for the said group as a whole in spite of a loose adaptative control in supervised individual areas.

11. The system of claim 10, wherein there is further provided means responsive to signals representative of the remote sginaling of the tripping of at least one tie-line, and additional input logic means responsive to said signals for reducing the value of interchange schedule in the computation of the interchange power deviation and for gating the control deviation thus obtained to the regulating means.

12. The system of claim 11, wherein there are further provided means responsive to a fourth signal representative of a predetermined positive deviation of power interchange, means responsive to a fifth duplicated signal representative of a predetermined positive deviation of the control deviation, means responsive to a positive alarm signal, means responsive to a sixth signal representative of a predetermined drop of the system frequency, logic means for providing a seventh signal when both the said fourth signal and the said positive alarm signal are simultaneously actuated and/or both the said fourth and sixth signals, the said seventh signal being inhibited when the said fifth signal is actuated, logic means to provide the tripping of tie-lines to the adjoining areas when said seventh signal is actuated, thereby to provide the sectionalizing of the area from the outside group when an abnormal control deviation in the outside group seriously threatens the security of power supply in the area.

13. In a system for controlling the production of power in an area integrated in an interconnected electric network, the combination comprising, means responsive to a signal representative of the instantaneous power load of each one of determined elements in the area which are significantly influenced by positive power interchange deviations, thereby to provide a positive warning signal when one of said signals applied at the input thereof exceeds a predetermined alarm threshold, means responsive to a signal representative of the instantaneous power load of each one of determined elements in the area which are significantly influenced by negative power interchange deviations, thereby to provide a negative warning signal when one of said signals applied at the input thereof exceeds a predetermined alarm threshold, means responsive to a signal representative of the integrated control deviation with cyclic reset to zero for providing first duplicated signals indicating if the control deviation exceeds a predetermined value in either the positive or negative polarity, means responsive to a signal representative of the frequency deviation for providing second duplicated signals indicative of the signal of the frequency deviation and third duplicated signals indicating if the frequency deviation exceeds a predetermined value in either the positive or negative polarity, input logic means responsive to a signal representative of the power interchange deviation and frequency deviation, and to the said positive and negative alarm signals for gating the said signal representative of the power interchange deviation and frequency deviation for the same polarity as that of the actuated of said alarm signals, input logic means responsive to a signal representative of the control deviation and to the said first, second and third signals for gating the signal representative of the control deviation for the same polarity as that of the actuated of the said first or third signals, each of said first signals being inhibited when the actuated of said second signals is of the opposite polarity, summing means for combining the output signals from said logic means to provide an error signal, and regulating means responsive to the error signal for producing the time integral of the inverse of said error signal.

14. The system of claim 13, wherein there are further provided logic means responsive to the said control signal, and to an alarm signal and/or a signal representative of a predetermined frequency drop, said logic means being effective to increase the maximum threshold of the control signal in the said output means.

15. The system of claim 14, wherein there are further provided means responsive to a signal from a supervisor regulator that supervises a group of adjoining areas in the interconnected system for providing an additional signal component, this component being added to the said integrated error signal, thereby to provide an accurate control for the said group as a whole in spite of a loose adaptative control in supervised individual areas.

16. The system of claim 15, wherein there are further provided means responsive to signals representative of the remote signaling of the tripping of at least one tie-line, and additional input logic means responsive to said signals for reducing the value of interchange schedule in the computation of the interchange power deviation and for gating the control deviation thus obtained to the regulating means.

17. The system of claim 16, wherein there are further provided means responsive to a fourth signal representative of a predetermined positive deviation of power interchange, means responsive to a fifth duplicated signal representative of a predetermined positive deviation of the control deviation, means responsive to a positive alarm signal, means responsive to a sixth signal representative of a predetermined drop of the system frequency, logic means for providing a seventh signal when both the said fourth signal and the said positive alarm signal are simultaneously actuated and/or both the said fourth and sixth signal are actuated, the said seventh signal being inhibited when the said fifth signal is actuated, logic means to provide the tripping of tie-lines to the adjoining areas when said seventh signal is actuated, thereby to provide the sectionalizing of the area from the outside group when an abnormal control deviation in the outside group seriously threatens the security of power supply in the area.

18. In a system for controlling the production of power in an area integrated in an interconnected electric network, the combination comprising means responsive to signals representative of the instantaneous temperature of determined elements in the area which are significantly influenced by positive power interchange deviations, thereby to provide a positive warning signal when one of said signals applied at the input thereof exceeds a predetermined alarm threshold, means responsive to signals representative of the instantaneous temperature of determined elements in the area which are significantly influenced by negative power interchange deviations, thereby to provide a negative warning signal when one of said signals applied at the input thereof exceeds a predetermined alarm threshold, means responsive to a signal representative of the integrated control deviation with cyclic reset to zero for providing first duplicated signals indicating if the control deviation exceeds a predetermined value in either the positive or negative polarity, means responsive to a signal representative of the frequency deviation for providing second duplicated signals indicative of the sign of the frequency deviation and third duplicated signals indicating if the frequency deviation exceeds a predetermined value in either the positive or negative polarity, means responsive to the control signal for providing a fourth signal indicating if said control signal exceeds a prescribed value in either the positive or negative sense, input logic means responsive to a signal representative of the power interchange deviation and frequency deviation, and to the said positive and negative alarm signals for gating the said signal representative of the power interchange deviation and frequency deviation for the same polarity as that of the actuated of said alarm signals, input logic means responsive to a signal representative of the control deviation and to the said first, second and third signals for gating the signal representative of the control deviation for the same polarity as that of the actuated of said first or third signals, each of said first signals being inhibited when the actuated of said said second signals is of the opposite polarity, input logic means repsonsive to a signal representative of the control deviation and to the said second and fourth signals for gating the signal representative of the control deviation for the same polarity as that of said fourth signal, the latter signal being inhibted if the said second signal is of the opposite polarity, summing means for combining the output signals from said logic means to provide an error signal, regulating means responsive to the said error signal for producing the time integral of the inverse of said error signal, and further comprising logic means responsive to the said control signal, and to an alarm signal or a signal representative of a predetermined frequency drop or both, said logic means being effective to increase the maximum threshold of the control signal in the said output means.

19. The system of claim 18, wherein there are further provided means responsive to a signal from a supervisor regulator that supervises a group of adjoining areas in the interconnected system for providing an additional signal component this component being added to the said integrated error signal, thereby to provide an accurate control for the said group as a whole in spite of a loose adaptative control in supervised individual areas, and wherein there are further provided means responsive to signals representative of the remote signaling of the tripping of at least one tie-line, and additional input logic means responsive to said signals for reducing the value of interchange schedule in the computation of the interchange power deviation and for gating the control deviation thus obtained to the regulating means.

20. The system of claim 19, wherein there are further provided means responsive to a fifth signal representative of a predetermined positive deviation of power interchange, means responsive to a sixth duplicated signal representative of a predetermined positive deviation of the control deviation, means responsive to a positive alarm signal, means responsive to a seventh signal representative of a predetermined drop of the system frequency, logic means for providing an eighth signal when both the said fifth signal and the said positive alarm signal are simultaneously actuated and/or both the said fifth and seventh signals are actuated, the said eighth signal being inhibited when the said sixth signal is actuated, logic means to provide the tripping of tie-lines to the adjoining areas when said eighth signal is actuated, thereby to provide the sectionalizing of the area from the outside group when an abnormal control deviation in the outside group seriously threatens the security of power supply in the area.

21. In a system for controlling the production of power in an area integrated in an interconnected electric network, the combination comprising means responsive to a signal representative of the instantaneous power load of each one of determined elements in the area which are significantly influenced by positive power interchange deviations, thereby to provide a positive warning signal when one of said signals applied at the input thereof exceeds a predetermined alarm threshold, means responsive to a signal representative of the instantaneous power load of each one of determined elements in the area which are significantly influenced by negative power interchange deviations, thereby to provide a negative warning signal when one of said signals applied at the input thereof exceeds a predetermined alarm threshold, means responsive to a signal representative of the integrated control deviation with cyclic reset to zero for providing first duplicated signals indicating if the control deviation exceeds a predetermined value in either the positive or negative polarity, means responsive to a signal representative of the frequency deviation for providing second duplicated signals indicative of the sign of the frequency deviation and third duplicated signals indicating if the frequency deviation exceeds a predetermined value in either the positive or negative polarity, means responsive to the control signal for providing a fourth signal indicating if said control signal exceeds a prescribed value in either the positive or negative sense, input logic means responsive to a signal representative of the power interchange deviation and frequency deviation, and to the said positive and negative alarm signals for gating the said signal representative of the power interchange deviation and frequency deviation for the same polarity as that of the actuated of said alarm signals, input logic means responsive to a signal representative of the control deviation and to the said first, second and third signals for gating the signal representative of the control deviation for the same polarity as that of the actuated of said first or third signals, each of said first signals being inhibited when the actuated of said second signals is of the opposite polarity, input logic means responsive to a signal representative of the control deviation and to the said second and fourth signals for gating the signal representative of the control deviation for the same polarity as that of said fourth signal, the latter signal being inhibited if the said second signal is of the opposite polarity, summing means for combining the output signals from said logic means to provide an error signal, and regulating means responsive to the said error signal for producing the time integral of inverse of said error signal.

22. The system of claim 21, wherein there are further provided means responsive to a signal from a supervisor regulator that supervises a group of adjoining areas in the interconnected system for providing an additional signal component, this component being added to the said integrated error signal, thereby to provide an accurate control for the said group as a whole in spite of a loose adaptative control in supervised individual areas, and wherein there are further provided means responsive to signals representative of the remote signaling of the tripping of at least one tie-line, and additional input logic means responsive to said signals for reducing the value of interchange schedule in the computation of the interchange power deviation and for gating the control deviation thus obtained to the regulating means.

23. A system of claim 22, wherein there are further provided means responsive to a fifth signal representative of a predetermined positive deviation of power interchange, means responsive to a sixth duplicated signal representative of a predetermined positive deviation of the control deviation, means responsive to a positive alarm signal, means responsive to a seventh signal representative of a predetermined drop of the system frequency logic means for providing an eighth signal when both the said fifth signal and the said positive alarm signal are simultaneously actuated and/or both the said fifth and seventh signals are actuated, the said eighth signal being inhibited when the said sixth signal is actuated, logic means to provide the tripping of tie-lines to the adjoining areas when said eighth signal is actuated, thereby to provide the sectionalizing of the area from the outside group when an abnormal control deviation in the outside group seriously threatens the security of power supply in the area.

References Cited

UNITED STATES PATENTS

| | | | |
|---|---|---|---|
| 3,173,002 | 3/1965 | Starr | 307—57 X |
| 3,270,209 | 8/1966 | Cohn | 307—57 |
| 3,325,650 | 6/1967 | Barnes | 307—87 X |

ROBERT K. SCHAEFER, Primary Examiner

H. J. HOHAUSER, Assistant Examiner

U.S. Cl. X.R.

307—87